June 22, 1965 M. P. LEBOURG 3,191,142
LOW ACOUSTIC VELOCITY SUPPORT MEMBER FOR LOGGING TOOLS
Filed May 16, 1961
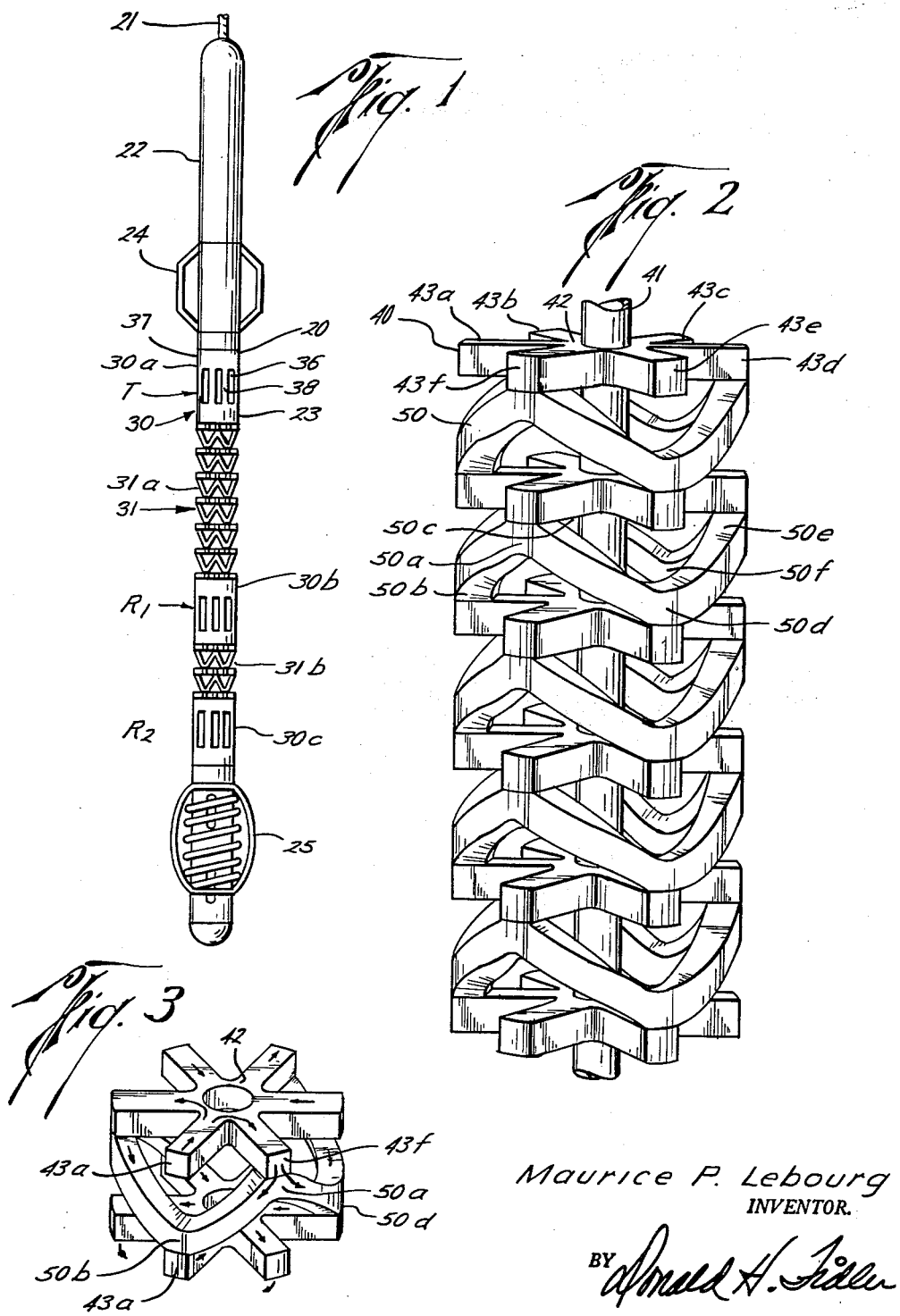
Maurice P. Lebourg
INVENTOR.
BY
ATTORNEY United States Patent Office 3,191,142
Patented June 22, 1965

3,191,142
LOW ACOUSTIC VELOCITY SUPPORT MEMBER FOR LOGGING TOOLS
Maurice P. Lebourg, Houston, Tex., assignor to Schlumberger Well Surveying Corporation, Houston, Tex., a corporation of Texas
Filed May 16, 1961, Ser. No. 110,469
5 Claims. (Cl. 340—17)

This invention relates to exploratory tools for use in well bores and, more particularly, to acoustic well logging tools which probe the media surrounding a well bore with pulses of acoustic energy.

An acoustic well logging tool is generally cylindrically shaped and suitably sized for passage through a fluid filled well bore. Normally, the tool carries two or more transducers which are disposed and secured at a fixed distance from one another. In a typical acoustic tool having three transducers, one of the transducers serves as a transmitter of sound waves while the remaining transducers serve as receivers of sound waves. The receivers are spaced from one another at a predetermined distance and are disposed to one side of the transmitter along the longitudinal axis of the tool. In operation, the transmitter in the tool is electrically actuated periodically to emit pulses of acoustic energy (or pressure waves) which propagate outwardly from the transmitter with a velocity dependent upon the media traversed by the energy. The arrival of the acoustic energy at the successively positioned receivers is detected to trigger a timing circuit in the tool which functions to ascertain the time required for a given pulse of acoustic energy to travel the predetermined distance between the two receivers. From a time measurement obtained by the timing circuit, a composite velocity of media traversed by an acoustic pulse can be determined. In turn, composite velocity indications can be correlated to specific types of earth formations or other media. Indications of travel time or velocity obtained in open boreholes can also be related to the porosity of earth formations. If desired, the timing function can be accomplished with only a single transmitter and receiver.

Acoustic energy as above discussed can be generated or intercepted by a piezoelectric or a magnetostrictive transducers in a well known manner.

In a typical open borehole, an acoustic tool is commonly spaced from the wall of the well bore so that the emitted acoustic wave energy or pressure pulses are first omni-directionally transmitted through the fluid (usually mud) in the well bore and, after traveling through the fluid over the distance from the tool to the wall of the well bore, a portion of the traveling wave energy is transmitted to adjacent earth formations. The characteristic velocity of wave motion or the wave energy through the fluids in the well is generally in the neighborhood of 5000 feet per second, while the characteristic velocity of wave motion through the earth formations may vary from 5000 feet per second to 25,000 feet per second. Thus, the portion of the acoustic wave energy transmitted into the formations generally travels at a higher velocity than the corresponding portion of the wave energy traveling in the well bore fluid. Because of this, the portion of the wave energy traveling through earth formations reaches a receiver prior to the time that the portion of the acoustic wave energy traveling through the fluids does. It is this feature of higher formation velocity which permits measurement of the velocity of acoustic energy in earth formations surrounding a well bore.

Typically, each pulse of acoustic energy upon intercepting a receiver transducer generates an electrical signal containing a number of undulations, cycles or vibrations. The time measurement is generally based upon the detection of a given portion or characteristic of an electrical signal developed at the respective receivers for a given traveling pulse of acoustic energy. A commonly used characteristic of a corresponding electrical signal for detecting purposes, for example, is a voltage amplitude value. This is made possible because the undulations, cycles or vibrations of a typical electrical signal as developed from a typical pulse of acoustic energy generally include, in the first cycle, a first peak of a given polarity followed by a second peak of an opposite polarity and approximately three times the magnitude of the first peak and, in the second cycle, a third peak with a polarity similar to the first peak and about ten times the magnitude of the first peak. Hence, when a selected characteristic voltage amplitude value is exceeded, a detection signal for operating the timing circuit can be developed. The characteristic voltage amplitude value selected for detection purposes is generally such that detection will occur during the first cycle of a signal. The selection of a voltage amplitude characteristic of a first cycle of the signal to detect the first arrival of the acoustic signal is desirable because the voltage amplitude values of subsequent cycles are generally distorted because of acoustic reflections in the borehole.

From the foregoing discussion concerning the nature of acoustic wave propagation in an open borehole and timing of such propagation over a fixed distance, it is apparent that a suitable supporting means for the transducers must be incapable of passing detectable acoustic energy longitudinally between the transducers at a velocity higher than that of the adjacent earth formations. Obviously, if the supporting means are not so constructed, the receiver circuit would be triggered prematurely by the acoustic energy traveling through the support means thereby to prevent the timing circuit from obtaining a time value accurately related to the velocity of the adjacent earth formations or other media.

Heretofore, the housing or support means provided for supporting and spacing the transducers from one another have had low strength characteristics and either (1) a low velocity characteristic, or (2) the support means have had an attenuating characteristic to suppress the amplitude of the energy.

Accordingly, it is an object of the present invention to provide new and improved acoustic logging tools wherein the support has high strength qualities as well as an acoustical inhibition characteristic relative to the transmission of detectable acoustic lengthwise of the support between transducers.

A further object of the present invention is to provide new and improved acoustic logging tools having a relatively high strength and stiffness to withstand the shocks and forces inherently encountered in a logging operation.

Another object of the present invention is to provide acoustic logging tools with a support strong in tension to facilitate a fishing or retrieving operation if the tool should become temporarily immovable in the well bore.

Still another object of the present invention is to provide new and improved acoustic logging tools having a high strength, unitary and integral support constructed and arranged for artifically increasing the normal time interval required for an acoustic pulse to pass therethrough.

A still further object of the present invention is to provide a new and improved support for acoustic logging tools which is constructed of metal with a configuration such that the support has a lower velocity characteristic than normally would be expected.

Apparatus in accordance with the present invention includes an elongated, relatively stiff, high-strength metallic support for carrying at least two acoustic transducers in a spaced apart relation. The general configuration of the support is characterized by a repetitive pattern along the length of the member formed by a flat star-shaped member similar to the shape of an asterisk and an undulated ring-like member, which members alternate along the support and are so arranged to provide an acoustic path which is substantially longer in distance than a straight line distance along the support. The support so constructed provides substantial acoustic attenuation of acoustic energy and a relatively long acoustic path due to the constantly altering directions of the acoustic path.

The novel features of the present invention are set forth with particularity in the appended claims. The present invention, both as to its organization and manner of operation, together with further objects and advantages thereof, may best be understood by way of illustration and example of certain embodiments when taken in conjunction with the accompanying drawings in which:

FIG. 1 is a view of an acoustic logging tool embodying the present invention;

FIG. 2 is an enlarged view of a section of the housing embodying the present invention; and FIG. 3 is a perspective view of a portion of the housing embodying the present invention.

In the description to follow, it should be understood that the term "acoustic energy" refers primarily to compressional wave energy although it is not intended to exclude acoustic energy such as shear wave energy, etc. Likewise the term "characteristic velocity" as hereinafter used means the velocity value normally obtained when a pulse of acoustic energy traverses a solid, uninterrupted material object in a straight line path between two fixed points in a given time. The term "detectable" energy or "detectable" acoustic energy as used hereinafter means acoustic energy having a characteristic which is capable of energizing a transducer such that a detecting circuit is responsive to the electrical signal generated in response to the characteristic of the acoustic energy. "Apparent velocity," as hereinafter used, means an apparent velocity value normally obtained when a pulse of detectable acoustic energy traverses a material object, constructed and arranged in accordance with the present invention, between two fixed points lengthwise of the object over a time interval other than would be normally expected for the object in its solid configuration. The term "acoustic path" as hereinafter used means solid, substantially continuously connected material providing a medium through which acoustic wave motion may be transmitted.

The present invention is concerned with an acoustic logging tool having an elongated support constructed of steel for strength and ruggedness. Since the characteristic velocity of acoustic energy in steel is in the neighborhood of 17,000 feet per second and the range of characteristic velocities of the earth formations or media desired to be investigated is from 5,000 to 25,000 feet per second, it will be appreciated why a steel support housing has heretofore been considered unusable.

Considering first the fact that the characteristic velocity, distance, and time factors are related by the classical expression $S=vt$ so that from any two given values, the third may be reliably calculated, it will be appreciated that for a fixed length of housing, the time factor is inversely related to the velocity factor. Therefore, it would appear that acoustic energy traveling over a fixed length of steel housing which has a characteristic velocity of 17,000 feet per second, would invariably travel over the fixed distance in a fixed time. However, by means of the present invention, the construction of the steel housing can be arranged so that detectable energy travels over a fixed length of housing with an apparent velocity which is considerably less than 17,000 feet per second and in a time interval which is greater than the aforesaid fixed time. In fact, the apparent velocity of a steel housing may be made substantially equal to or less than the characteristic velocity of the fluids in the well bore.

In accordance with the present invention, prime conditions for reducing the characteristic velocity of a length of a support constructed of steel are to substantially eliminate any direct linear path longitudinally of the support and to provide an acoustic interference pattern lengthwise of the support. Stated another way, the linear continuity of the support in its lengthwise direction is substantially interrupted or disrupted, and by so doing, tortuous acoustic paths are formed. However, the interruption is such that there are remaining longitudinal interconnecting ties which prevent substantial longitudinal flexing of the support. This effectively lengthens the path that acoustic energy must follow and also affects the mechanical characteristics of a support by decreasing the longitudinal unit spring rate of the support and the weight per unit length.

As will now be explained, a derived relationship between the unit spring rate and weight per unit length can give a fair approximation of the "apparent velocity" of a support constructed and arranged in accordance with the present invention.

From basic physics, it is known that the velocity V in elongated bars and tubes is equal to $$V = \sqrt{\frac{E}{\rho}} \qquad (1)$$

where E is Young's modulus of elasticity and $\rho$ is the mass density. It is also known that the weight density $d$ is equal to $$d = \rho g \qquad (2)$$

where $g$ is the gravitational constant of 32.2 pounds per sec.² Young's modulus of elasticity E is, of course, equal to $$E = \frac{Pl}{A(\Delta l)} \qquad (3)$$

where P is a force in pounds; $l$ is a length in inches; A is a cross-sectional area in square inches; and $\Delta l$ is a change in length in inches.

Substituting Equations 2 and 3 into Equation 1 and adjusting the units into inches and pounds gives the following equation for velocity $$V = \sqrt{P \frac{(l)}{(\Delta l)} \frac{(l)}{(W)} \frac{(g)}{12}} \qquad (4)$$

Equation 4 can be rearranged as follows:

$$V = \sqrt{\frac{\frac{g}{12} \frac{P}{(\Delta l/l)}}{W/l}} = 1.639 \sqrt{\frac{s}{w}} \qquad (5)$$

where V is velocity in feet per second and where $s$ is the unit spring rate in pounds/in./in., W equals the weight in pounds, and $w$ equals the weight per unit length in pounds/in.

The above derived relationship is considered applicable for deriving an approximate apparent velocity value for a support with a substantially non-linear or interrupted acoustic path as will hereinafter be described. The apparent velocity derived from the use of this formula is also understood to be the limiting value of velocity which would be obtained as the frequency of the acoustic energy approaches zero.

The precise theoretical effect of frequency of the pulse of energy relative to the above derived relationship has not been exactly determined. However, the following effects have been observed. A predominant frequency value for a pulse of energy from a given transmitter can be shown to be the resonant frequency of the transmitter and can be easily determined by measurement of the time period of a cycle. It should be appreciated that a pulse of energy from a transmitter is generally made up of a multitude of frequencies above and below that of the predominant frequency. The intensity of the frequency components is generally a maximum at the predominant frequency and decreases for frequencies above and below the predominant frequency.

The ability of a support to pass sound will depend upon the following:

(1) Acoustic path length
(2) Attenuation tendency or inhibition characteristic
(3) Spring rate and mass per unit length.

Disregarding pass bands and other frequency sensitive phenomena, it can be generally stated that the maximum velocity will be determined by the interconnected path length. For a given path width, sound frequencies with a quarter-wave length less than the path width are permitted to pass with relatively low resistance. As the frequency is decreased, the quarter-wave length is increased and the resistance to passage increased, causing a reduction in signal intensity. This is accomplished also by a decrease in the speed of transmission. As the frequency continues to decrease, the resistance to passage increases and the speed of propagation decreases until the limiting value based on the unit spring rate and mass per unit length is reached. From this it can be seen that the apparent detectable velocity will fall somwhere between the values obtained by unit spring rate-mass determination and by a determination of the length of the acoustic path, depending upon the frequency distribution of the acoustic pulse. As would be expected, with a steel support constructed and arranged to have a given apparent velocity calculated by means of the previously derived relationship, a pulse of energy with, for example, a predominant frequency of 30 kc. generally travels through the support with an actual apparent velocity which is higher than a calculated apparent velocity derived from the spring rate and weight per unit length.

Turning now to specific illustrations of the present invention, it should be understood that the present invention involves an elongated and generally cylindrical well tool which is to be used in a well bore containing a well fluid. The tool is adapted to be passed through the well bore by means of an armored electrical cable spooled on a surface-located winch and is electrically coupled to surface indicating and recording units.

In FIG. 1 there is illustrated an elongated but rigidly constructed acoustic logging tool 20 adapted for passage in the above described customary manner through a well bore (not shown) by means of an armored electrical cable 21 and winch (not shown) which is situated at the earth's surface. The tool 20 includes an upper, tubular cartridge or housing 22 and a lower, tubular housing 23, both of which are preferably constructed of steel. A single centralizer support device 24 disposed at the center of gravity of the tool 20 may be employed if the tool is to be centered in a well bore. Alternatively, two or more centralized supports disposed along the length of the tool may be employed if so desired. Also, if desired, a caliper device 25 for measuring the diameter of the well bore may be coupled to the tool 20, for example, at its lower end as shown in the drawing.

Within the upper cartridge 22 are electronic components and circuits to periodically actuate the transmitter T and to perform the measuring function in response to signals from the receivers $R_1$ and $R_2$. The electronic circuits are coupled via cable 21 to conventional surface indicating and recorder instruments (not shown). Suitable circuit arrangements, for example, are illustrated in Patent No. 2,938,592 granted to C. J. Charske and hence need not be further elaborated upon.

The lower housing 23 includes three illustrative and similarly formed transducer sections identified by the number 30 and differentiated from one another by the letters $a$, $b$, and $c$. Transducer sections 30 may be separated from one another by identically formed acoustic inhibiting sections identified by the number 31 and differentiated from one another by the letters $a$ and $b$. In general, each transducer section 30 is constructed and arranged to permit and to facilitate the travel of acoustic energy in a generally radial pattern between a transducer within a tubular housing and the fluids or muds (not shown) in the well bore which are exterior of the tubular over the portions of the housing between transducer section 31 is constructed and arranged so as to increase the apparent time required for detectable energy to travel over the portions of the housing between transducer sections 30.

A transducer section 30, as illustrated in FIG. 1 comprises a plurality of elongated openings 36 in a tubular member 37. Openings 36 are generally rectangularly shaped lengthwise of the member 37 and are equidistantly spaced from one another about the periphery of the member. The width of an opening 36 is defined between parallel and longitudinally extending side surfaces and is generally equal to the width of the sections or portions 38 of the member 37 disposed between adjacent openings 36. The length of an opening 36 is defined between upper and lower inside end surfaces which may slope inwardly towards one another from the outer surface of the member 37 to its inner surface (not shown). The length of the openings 36 generally should be equal to or greater than the longitudinal dimension of a transducer within the member 37. Since a typical magnetostrictive transducer has an appreciable longitudinal dimension (2″ to 3″ in a typical instrument) the openings 36 are illustrated as elongated in a direction lengthwise of the member 37. The sections 38 of the member 37 between the openings 36 provide excellent stress bearing qualities. Preferably, there are from 8 to 12 such openings 36 spaced about the periphery of the housing for a magnetostrictive transducer which emits primarily radial pressure waves. This range of openings has been found to provide an efficiency of transmission of sound radially from or into the member 37, which ranges from 98% to virtually 100%.

Each acoustic inhibiting section 31 is constructed and arranged to provide a generally tortuous configuration. Hence, acoustic wave transmission lengthwise of the support occurs by traveling tortuous paths which are greater than the straight line distance along the support. More specifically, as shown in FIG. 2, an acoustic inhibiting section 31 exhibits a characteristic pattern which prevails over a length of the lower section between adjacent transducer sections 30. The preferred pattern as illustrated, consists of a star shaped member 40 and an undulated ring-like member 50, which members alternate along the length of the section. A section 31 may be suitably coupled to a tubular member 37 by welding the sections to one another.

The star shaped member 40 has a central hub portion 42 with six extensions 43 ($a$–$f$) where adjacent extensions are angularly spaced relative to one another by 60°. The undulated member 50 is ring-like or tubular with undulations to form projections or lobes 50 ($a$–$f$), which projections are angularly displaced at an angle of 60° relative to one another. Thus, three upper projections $50a$, $50c$, $50e$ and three lower projections $50b$, $50d$, $50f$ are provided for each member 50. The members 40 and 50 are attached to one another in a symmetrical pattern along the length of a section as, for example by welding. The symmetry of the pattern is achieved by respectively connecting the three upper projections of a member 50 to the lower sides of three extensions of a member 40 in repeated alignment along the length of the section. Similarly, the lower projections of a member 50 are connected to the upper sides of three extensions of a member 40 in repeated alignment along the length of the section.

Considering an exemplary acoustic travel path as shown in FIG. 3, acoustic energy would travel along extension $43a$ to the hub 42 and be reversed to travel out extension $43f$. From extension $43f$, the acoustic energy is transferred to projection $50a$ of member 50 and travels respectively towards projections $50b$ and $50d$. At the end of projection $50b$, the energy is transferred to the extension $43a$ of a member 40 once again. It will be appreciated that the reflection and refraction of acoustic energy attenuates the travel of energy lengthwise of the support member. Aside from attenuation, a very long undular path for transmission of acoustic energy is presented relative to the length of the support.

An example of the foregoing described structure is as follows: members 40 were formed from ½ inch plate steel with the extensions 43 bounded lying within an imaginary circle having a 4 inch diameter. The cross-section of a typical extension 43 was approximately ½ inch square. The members 50 were cut from a steel tube with a 4 inch outside diameter and a 3 inch inside diameter. Each member 50 had 3 upper projections and 3 lower projections within parallel planes spaced 1.3 inches from one another. The cross-section of a section of member 50 was roughly ½ inch square. Four of each of the members 40 and 50 were silver soldered to one another to form an assembly with an overall length of 5.9 inches. The acoustic velocity calculated by virtue of path length only was 2780 feet per second. The acoustic velocity calculated by Formula 5 as given previously was 1341 feet per second. The actual velocity could not be measured since it was less than the velocity of the fluid medium.

From the foregoing description of the present invention it will be appreciated how to provide an acoustic logging tool with a housing so constructed to substantially eliminate uniform longitudinal paths to inhibit the immediate transmission of detectable acoustic energy therealong.

It will be noted that the example illustrated in accordance with the present invention has an apparent velocity less than the velocity of a fluid, or 5000 feet per second. Obviously, higher apparent velocity values can be obtained by modifying the construction in accordance with the disclosed principles if desired and the example is merely illustrative and should not be considered as a limitation. For open hole well bores, the lower apparent velocity arrangement is preferable to provide for a wide operating range. In cased well bores, a higher apparent velocity arrangement may be suitable since the steel casing is known to have a velocity of 17,000 feet per second.

In the disclosed arrangements, the transducers are so arranged that they are exposed to well fluids. However, if desired, the transducers could be enclosed in rubber boots and mounted in a variety of suitable housings. As shown in FIG. 2, a tubular member 41 for passing electrical conductors may be passed through the support. Member 41 can be constructed of any of the well known, low velocity materials since no structural strength is required of the member.

While a particular embodiment of the present invention has been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. Apparatus for acoustically surveying a well bore comprising: an elongated, rigid support member constructed of steel and adapted to be passed through a well bore; at least two acoustic transducers coupled to said support member in spaced-apart relation, the portion of said steel support member between said transducers being comprised of a series of star shaped members and interlinking spacer segments, each having an axial length short relative to the spacing between said transducers, said star shaped members and said segments being rigidly and acoustically connected to one another to provide an undular acoustic path longitudinally of said support member.

2. Apparatus for acoustically surveying a well bore comprising: an elongated, rigid support member constructed of steel and adapted to be passed through a well bore; at least two acoustic transducers coupled to said support member in spaced-apart relation, the portion of said steel support member between said transducers being comprised of a series of star shaped members and interlinking ring-like spacer segments, each having an axial length short relative to the spacing between said transducers, said segments having angularly spaced, axially extending portions rigidly and acoustically connecting said star shaped members to one another to provide an undular acoustic path longitudinally of said support member.

3. Apparatus for acoustically surveying a well bore comprising: an elongated, rigid support member constructed of steel and adapted to be passed through a well bore; at least two acoustic transducers coupled to said support member in spaced-apart relation, the portion of said steel support member between said transducers being comprised of a series of star shaped members each having six extensions and ring-like interlinking spacer segments each having six axially extending projections, each of said members and segments having an axial length short relative to the spacing between said transducers, three projections of each segment being coupled to three extensions of one star member on one side thereof and three projections being coupled to thre other extensions of another star member on the other side of said segment, said segments rigidly and acoustically connecting said star shaped members to one another to provide an undular acoustic path longitudinally of said support member.

4. Apparatus for acoustically surveying a well bore comprising: an elongated, rigid support member constructed of steel and adapted to be passed through a well bore; at least two acoustic transducers coupled to said support member in spaced-apart relation, said support member between said transducers including a series of star shaped members and interlinking spacer segments rigidly and acoustically connecting said star shaped members to one another to alter the propagation of acoustic energy via the acoustic path extending longitudinally of said support member via said star members and said spacer elements.

5. Apparatus for acoustically surveying a well bore comprising: an elongated rigid steel support member having a generally cylindrical configuration and adapted to be passed through a well bore; and at least two acoustic transducers coupled to said support member in spaced-apart relation, the portion of said steel support member between said transducers being formed of a plurality of segments rigidly and acoustically connected to one another to provide a unitary construction, each of said segments having an axial length short relative to the spacing between said transducers and connected to each adjacent segment at a plurality of angularly spaced points to provide an acoustic path between said transducers which changes in direction from segment to segment and is substantially longer than the longitudinal spacing between said transducers.

References Cited by the Examiner

UNITED STATES PATENTS

| | | | |
|---|---|---|---|
| 2,233,992 | 3/41 | Wyckoff | 181—0.5 |
| 2,722,282 | 11/55 | McDonald | 181—0.5 |
| 2,757,358 | 7/56 | Ely | 340—18 |
| 2,794,512 | 6/57 | Martin | 181—0.5 |
| 2,998,723 | 9/61 | Smith et al. | 340—8 |
| 3,113,456 | 12/63 | Smith et al. | 340—1 |

SAMUEL FEINBERG, *Primary Examiner.*

CHESTER L. JUSTUS, CARL W. ROBINSON,
*Examiners.*

UNITED STATES PATENT OFFICE
CERTIFICATE OF CORRECTION

Patent No. 3,191,142                                                     June 22, 1965

Maurice P. Lebourg

It is hereby certified that error appears in the above numbered patent requiring correction and that the said Letters Patent should read as corrected below.

Column 6, line 4, strike out "over the portions of the housing between transducer sec-" and insert instead -- housing. Also, in general, each acoustic inhibiting sec- --; column 8, line 27, for "thre" read -- three --.

Signed and sealed this 21st day of December 1965.

(SEAL)
Attest:

ERNEST W. SWIDER                                              EDWARD J. BRENNER
Attesting Officer                                                    Commissioner of Patents

UNITED STATES PATENT OFFICE
CERTIFICATE OF CORRECTION

Patent No. 3,191,142  June 22, 1965

Maurice P. Lebourg

It is hereby certified that error appears in the above numbered patent requiring correction and that the said Letters Patent should read as corrected below.

Column 6, line 4, strike out "over the portions of the housing between transducer sec-" and insert instead -- housing. Also, in general, each acoustic inhibiting sec- --; column 8, line 27, for "thre" read -- three --.

Signed and sealed this 21st day of December 1965.

(SEAL)
Attest:

ERNEST W. SWIDER
Attesting Officer

EDWARD J. BRENNER
Commissioner of Patents